(12) United States Patent
Nakanishi

(10) Patent No.: US 10,885,402 B2
(45) Date of Patent: Jan. 5, 2021

(54) BOOK ELECTRONIZATION APPARATUS AND BOOK ELECTRONIZATION METHOD

(71) Applicant: SHARP KABUSHIKI KAISHA, Sakai (JP)

(72) Inventor: Tohru Nakanishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 69 days.

(21) Appl. No.: 16/276,469

(22) Filed: Feb. 14, 2019

(65) Prior Publication Data

US 2019/0258906 A1 Aug. 22, 2019

(30) Foreign Application Priority Data

Feb. 16, 2018 (JP) ................................ 2018-026446

(51) Int. Cl.
*G06K 9/72* (2006.01)
*G06K 9/34* (2006.01)
*G06K 9/22* (2006.01)
*G06K 9/20* (2006.01)

(52) U.S. Cl.
CPC ............. *G06K 9/72* (2013.01); *G06K 9/2018* (2013.01); *G06K 9/224* (2013.01); *G06K 9/344* (2013.01)

(58) Field of Classification Search
CPC ............... G06K 19/06; G06K 9/00483; G06K 9/00624; G06K 9/00677; G06K 9/2054; G06K 9/209; G06K 9/4628; G06K 9/6202; G06K 9/6274; G06K 9/72; G06K 9/344; G06K 9/224; G06K 9/2018; G06K 2209/01

See application file for complete search history.

(56) References Cited

U.S. PATENT DOCUMENTS

| | | | |
|---|---|---|---|
| 2011/0087955 A1* | 4/2011 | Ho ...................... | G06F 15/0291 715/230 |
| 2013/0021281 A1* | 1/2013 | Tse ........................ | G06F 3/0483 345/173 |
| 2016/0203110 A1* | 7/2016 | Ho .......................... | G06F 3/011 715/251 |
| 2017/0205975 A1* | 7/2017 | Jang ...................... | G06F 3/0481 |
| 2018/0322372 A1 | 11/2018 | Nakanishi et al. | |

FOREIGN PATENT DOCUMENTS

WO 2017/131184 A1 8/2017

* cited by examiner

*Primary Examiner* — Diane D Mizrahi
(74) *Attorney, Agent, or Firm* — ScienBiziP, P.C.

(57) ABSTRACT

A book electronization apparatus includes: a table capable of storing a type of ink and an absorption wavelength of an energy ray (X-ray) of the ink in association with each other; an acquisition unit that acquires, from the table, an absorption wavelength of an X-ray, which corresponds to an ink type that is input; and an image capturing unit that acquires three-dimensional data of a book by capturing an image of the book with the X-ray having the acquired absorption wavelength.

7 Claims, 6 Drawing Sheets

BOOK ELECTRONIZATION APPARATUS AND BOOK ELECTRONIZATION METHOD

BACKGROUND

1. Field

The present disclosure relates to a book electronization apparatus and a book electronization method.

2. Description of the Related Art

From a viewpoint of preservation or utilization of a book, it is desired that the content of a book is converted into electronic data. Since a book may be damaged when being opened, it is desired that the content of the book is able to be converted into electronic data without being opened. As a technology of such conversion into electronic data, a technology by which three-dimensional data of a book, which is acquired by X-ray radiation, is used to specify a page region corresponding to the page of the book and a character string or graphic in the page region is mapped to a two-dimensional plane has been known (for example, refer to International Publication No. WO2017/131184 (published on Aug. 3, 2017)). The three-dimensional data is a set of points which are also called nodes and each of which has information of a detection position of an X-ray and absorption intensity of the X-ray. According to the aforementioned technology, two-dimensional page data including a character string or graphic written or drawn in the book is created. Each two-dimensional page data is constituted by a node, which is arranged on a predetermined plane, among the nodes.

In the related art as described above, the wavelength of an X-ray to be radiated is able to be decided by radiating X-rays having various wavelengths to a book and selecting an X-ray having an appropriate wavelength in accordance with absorption intensity of the X-rays, but it usually takes a long time when the wavelength of the X-ray is decided in such a manner. Thus, the related art as described above needs more consideration in shortening a time for converting the content of a book into electronic data.

It is desirable to achieve conversion of the content of a book into electronic data, which is able to be performed in a short time.

SUMMARY

According to an aspect of the disclosure, there is provided a book electronization apparatus that includes: a table capable of storing a type of ink and an absorption wavelength of an energy ray of the ink in association with each other; an acquisition unit that acquires, from the table, an absorption wavelength of an energy ray, which corresponds to an ink type that is input; and an image capturing unit that acquires three-dimensional data of a book by capturing an image of the book with the energy ray having the acquired absorption wavelength.

According to an aspect of the disclosure, there is provided a book electronization method that includes: acquiring an absorption wavelength of an energy ray, which corresponds to an ink type that is input, from a table capable of storing a type of ink and an absorption wavelength of an energy ray of the ink in association with each other; and acquiring three-dimensional data of a book by capturing an image of the book with the energy ray having the acquired absorption wavelength.

DESCRIPTION OF THE EMBODIMENTS

Embodiment 1

Hereinafter, an embodiment of the disclosure will be described in detail.

[Schematic Configuration of Book Electronization Apparatus]

Figure 1:
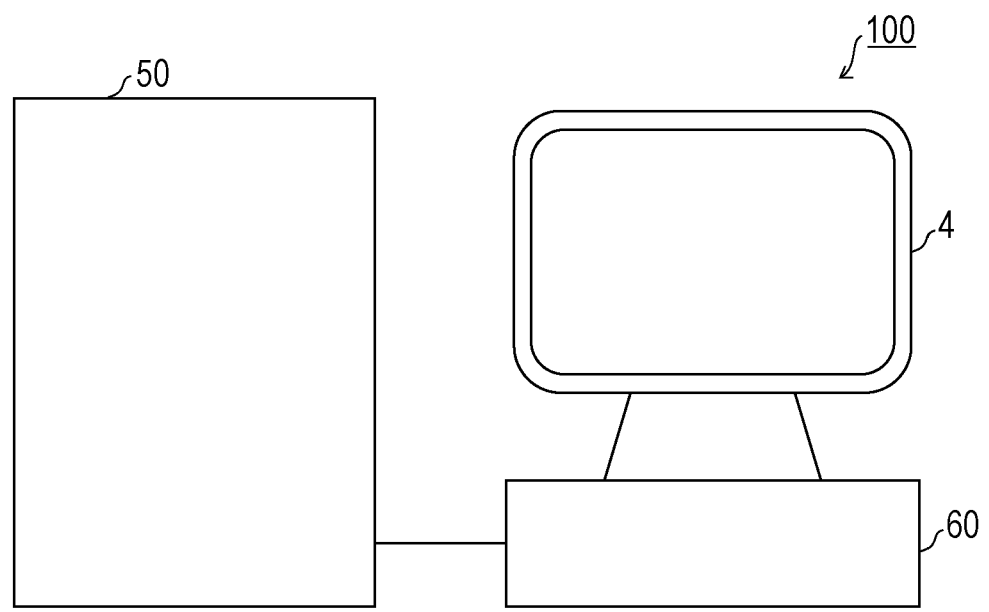
FIG. 1 is a view schematically illustrating a configuration of a book electronization apparatus according to an embodiment of the disclosure.
Figure 2:
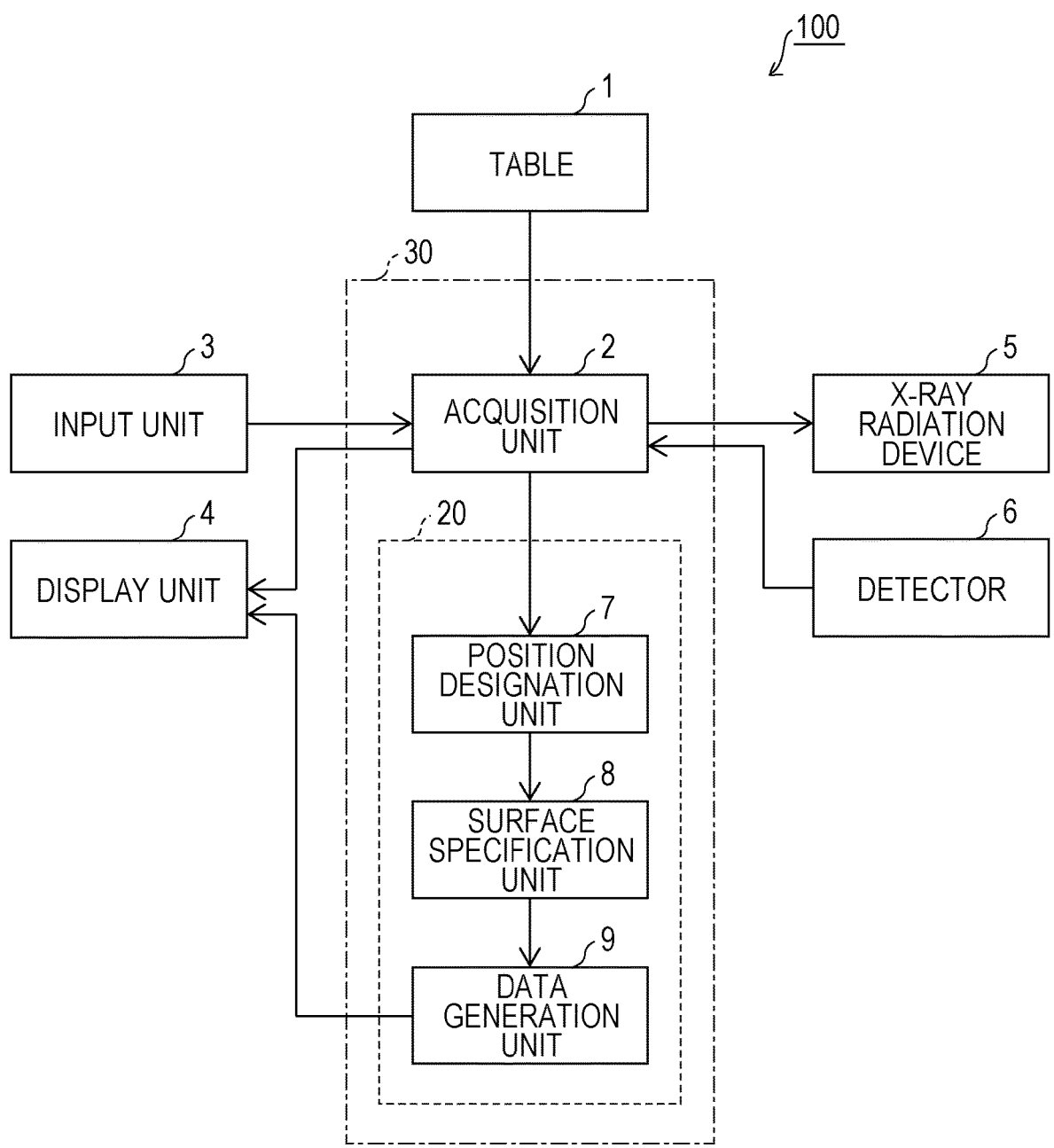
FIG. 2 is a block diagram of the book electronization apparatus according Embodiment 1 of the disclosure.

FIG. 1 is a view schematically illustrating a configuration of a book electronization apparatus 100 according to Embodiment 1 of the disclosure. FIG. 2 is a block diagram of the book electronization apparatus 100. As illustrated in FIG. 1, the book electronization apparatus 100 has an image capturing apparatus 50, a display unit 4, and a character recognition system 60. Moreover, as illustrated in FIG. 2, the book electronization apparatus 100 includes a table 1, an acquisition unit 2, an input unit 3, the display unit 4, an X-ray radiation device 5, a detector 6, a position designation unit 7, a surface specification unit 8, and a data generation unit 9. In FIG. 2, a reference sign 20 indicates a data creating unit and a reference sign 30 indicates a control block.

The display unit 4 displays information about an operation of the book electronization apparatus 100, such as input information from the input unit 3 in the image capturing apparatus 50, a detection result of the detector 6, or two-dimensional data created by the data generation unit 9. The display unit 4 is, for example, a liquid crystal display device.

The character recognition system 60 is a system capable of recognizing a character from two-dimensional page data that is input. The character recognition system 60 is constituted by, for example, a data processing device that is connected to the Internet. The character recognition system 60 is able to be constructed by, for example, a personal computer (PC) having sufficient processing capability.

The image capturing apparatus 50 is configured so as to radiate an X-ray to a book and detect the absorption wavelength of the X-ray and perform a sequence of data processing related thereto.

In the book electronization apparatus 100, the display unit 4 and the character recognition system 60 are integrally configured. On the other hand, the image capturing apparatus 50 is connected to the display unit 4 and the character recognition system 60 so as to allow data communication, and connected to the character recognition system 60 as illustrated in FIG. 1, for example. The table 1, the acquisition unit 2, the input unit 3, the position designation unit 7, the surface specification unit 8, and the data generation unit 9 are included in the character recognition system 60 of FIG. 1. The X-ray radiation device 5 and the detector 6 are included in the image capturing apparatus 50 of FIG. 1.

The table 1 stores a type of ink and an X-ray peak absorption wavelength of the ink in association with each other. For example, as illustrated in TABLE 1, the table 1 stores ink A to G and X-ray peak absorption wavelengths corresponding thereto. A range of each of the peak absorption wavelengths in TABLE 1 indicates a range where a peak of a wavelength of an X-ray which is absorbed by corresponding ink may be included.

The type of the ink is able to be specified by a known method. For example, the type of the ink is able to be specified by common chemical analysis of a component or by survey and analysis of a commercial product. The X-ray peak absorption wavelength (peak value of an absorption wavelength) which corresponds to the type of the ink is able to be specified by radiating X-rays having various wavelengths to the ink in a printed matter. Fluctuation of a detection value, for example, such as slight shift due to a difference in intensity of the X-rays, may be taken into consideration for the peak absorption wavelength. The peak absorption wavelength may be a representative value thereof, a range as described in TABLE 1, or a median of the range.

TABLE 1

| Type of ink | Wavelength (nm) |
|---|---|
| A | 0.12 to 0.15 |
| B | 0.14 to 0.17 |
| C | 0.16 to 0.19 |
| D | 0.15 to 0.18 |
| E | 0.11 to 0.14 |
| F | 0.001 to 0.01 |
| G | 10 to 12 |

The acquisition unit 2 acquires an input signal, such as an input signal from a user, from the input unit 3. The acquisition unit 2 also acquires, from the table 1, an X-ray peak absorption wavelength corresponding to an ink type that is input by the user. Furthermore, the acquisition unit 2 acquires three-dimensional data of a book by detection values of the detector 6 described below. On the other hand, the acquisition unit 2 outputs the X-ray peak absorption wavelength, which is acquired from the table 1, to the X-ray radiation device 5. The acquisition unit 2 also outputs information, such as the three-dimensional data from the detector 6, which is acquired by the acquisition unit 2 to the display unit 4 or the position designation unit 7 as appropriate.

The input unit 3 is a device through which an instruction to the acquisition unit 2 is input. The input unit 3 may be, for example, a hardware keyboard or a software keyboard.

The display unit 4 displays information about the book electronization apparatus 100, such as input information from the input unit 3, a detection result of the detector 6 described below, resultant three-dimensional data of a book, or two-dimensional data created by the data generation unit 9.

The X-ray radiation device 5 radiates an X-ray to a book. The X-ray radiation device 5 is configured so as to be able to adjust an output (wavelength) of X-ray radiation, for example, and is able to radiate an X-ray having a desired wavelength to the book.

The detector 6 detects the X-ray radiated to the book. The detector 6 is configured so as to acquire a detection value including a detection position of the X-ray and intensity of the X-ray at the position. The detector 6 outputs the acquired detection value to the acquisition unit 2 as three-dimensional data.

In this manner, the X-ray radiation device 5, the detector 6, and the acquisition unit 2 constitute an image capturing unit that acquires the three-dimensional data of the book by capturing an image of the book with an X-ray having the acquired peak absorption wavelength.

The position designation unit 7 designates an initial point for specifying a page region on the basis of data values of the three-dimensional data. The page region is a part corresponding to each of pages of the book in the three-dimensional data, and is a set of nodes that exist on a certain surface corresponding to the page. The position designation unit 7 outputs information of the initial point to the surface specification unit 8.

The surface specification unit 8 specifies a page region connected to the designated initial point. The surface specification unit 8 outputs, to the data generation unit 9, a set of points corresponding to the page region and data values of the points.

The data generation unit 9 converts data of the specified page region into two-dimensional (planar) page data. The page data has information about a positional relation of a plurality of characters or graphics (arrangement of the characters or the like) in a page of the book.

In this manner, the position designation unit 7, the surface specification unit 8, and the data generation unit 9 constitute a data creating unit 20 that creates two-dimensional data of the book from the three-dimensional data of the book.

[Book Electronization Method]

Hereinafter, a book electronization method according to an embodiment of the disclosure will be described. A book electronization method according to Embodiment 1 includes acquiring an X-ray peak absorption wavelength corresponding to an ink type that is input by a user, and acquiring three-dimensional data of a book. In the book electronization method, the X-ray peak absorption wavelength is acquired from the table 1. The three-dimensional data is acquired by capturing an image of the book with an X-ray having the peak absorption wavelength that is acquired from the table 1.

Figure 3:
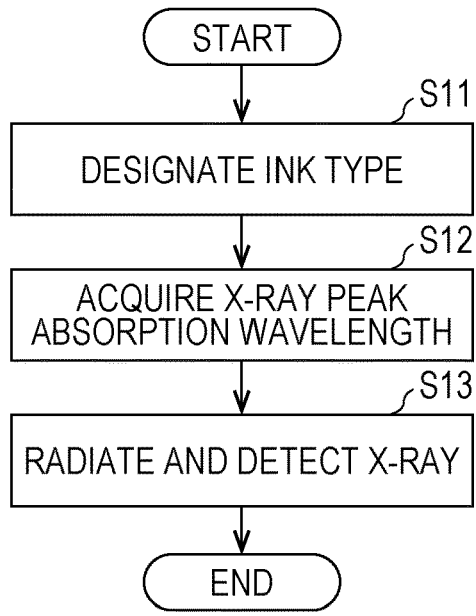
FIG. 3 is a flowchart until the book electronization apparatus according Embodiment 1 of the disclosure creates three-dimensional data of a book.

The book electronization method is able to be executed by using the book electronization apparatus of the present embodiment, which is described above. FIG. 3 is a flowchart until the book electronization apparatus according Embodiment 1 of the disclosure creates three-dimensional data of a book.

First, the input unit 3 designates an ink type of a book to be electronized (step S11). The ink type is input to the input unit 3, for example, by a user. The input unit 3 provides the acquisition unit 2 with information of the ink type that is designated.

The acquisition unit 2 acquires, from the table 1, an X-ray peak absorption wavelength with the ink type that is designated (step S12). In this manner, the X-ray peak absorption wavelength corresponding to the ink type that is input by the user is acquired from the table 1 that stores types of ink and X-ray peak absorption wavelengths of ink in association with each other. The peak absorption wavelength is immediately acquired upon designation of the ink type.

For example, in a case where the book includes the ink A, the user inputs "ink A" to the input unit 3. The acquisition unit 2 to which information of "ink A" is provided from the input unit 3 acquires an X-ray wavelength of 0.12 to 0.15 nm, which corresponds to the ink A, from the table 1 as the wavelength of the X-ray to be radiated to the book. In this case, the acquisition unit 2 selects, for example, a median (0.135 nm) in the range as the wavelength of the X-ray to be radiated.

Next, the acquisition unit 2 causes the X-ray radiation device 5 to radiate an X-ray, which has the peak absorption wavelength that is acquired, to the book and causes the detector 6 to detect the X-ray (step S13). The X-ray radiation device 5 radiates the X-ray to the book in a closed state. A part of the X-ray radiated from the X-ray radiation device 5 is absorbed by the ink in the book.

The detector 6 detects a detection value including a specific position of an X-ray and specific intensity of the X-ray that has passed through the book and provides detection values to the acquisition unit 2. The detector 6 detects the X-ray passing through a region in which ink in the book exists, as an X-ray having intensity weaker than that of the X-ray that has passed through a medium (paper) of the book. A set of the detection values constitutes three-dimensional data including a point at which the X-ray having such weak intensity is detected. The three-dimensional data includes information of positions of ink and a sheet surface and information of intensity of X-rays at the positions and thus indicates a position of the ink in the book, and the acquisition unit 2 acquires such three-dimensional data. In this manner, by capturing the image of the book with the X-ray having the peak absorption wavelength that is acquired from the table 1, the three-dimensional data of the ink in the book is acquired. The acquisition unit 2 provides the three-dimensional data to the position designation unit 7.

Figure 4:
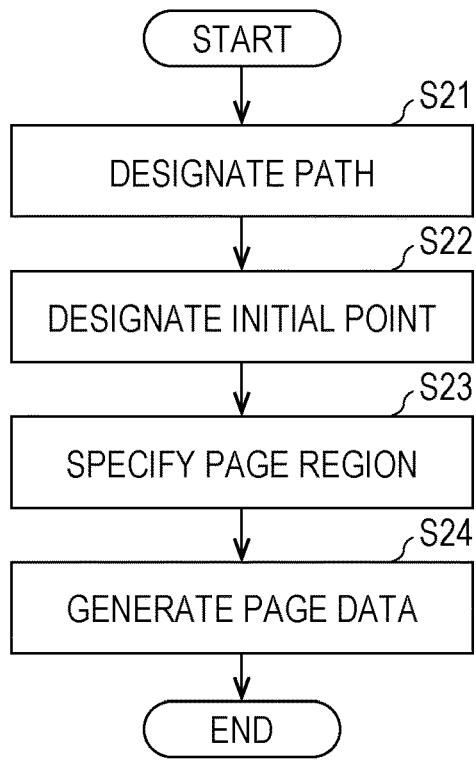
FIG. 4 is a flowchart until the book electronization apparatus according Embodiment 1 of the disclosure creates two-dimensional data from the three-dimensional data of the book.

FIG. 4 is a flowchart until the book electronization device according to Embodiment 1 creates two-dimensional data from the three-dimensional data of the book. The three-dimensional data includes, as a detection position of the X-ray and intensity thereof, information of a plurality of sheets (media, for example, paper) that are overlapped, a gap (air) between sheets, and ink (character) on a sheet. The creation of the two-dimensional data from the three-dimensional data is able to be implemented by a known method as described in International Publication No. WO2017/131184, for example.

The position designation unit 7 designates a linear path so that the linear path crosses at least one sheet (one page in a case where the book is a booklet) among the media that are overlapped in the three-dimensional data (step S21). For example, in the case where the book is a booklet, the path is a straight line that passes through a front cover and a back cover of the book and crosses all pages of the book.

The position designation unit 7 designates a point, which corresponds to a threshold for distinguishing a data value of a sheet and a data vale of a gap, in the path as an initial point of a page region (step S22). The position designation unit 7 designates, for example, a plurality of initial points corresponding to a plurality of page regions. The position designation unit 7 provides information of the initial point to the surface specification unit 8.

The surface specification unit 8 specifies a position of the page region that is decided on the basis of the initial point (step S23). For example, the page region is disposed, in orthogonal coordinates of the three-dimensional data, so as to cross a unit cell constituting the orthogonal coordinates. For example, the surface specification unit 8 sets a point, which has the aforementioned threshold or more in sides of the unit cell through which the page region crosses, as a point corresponding to the page region, and specifies the page region. The surface specification unit 8 provides information of the specified page region to the data generation unit 9.

The data generation unit 9 maps data values of points of the page region to a two-dimensional plane and thereby generates page data (step S24). Data values of respective points of the two-dimensional page data roughly correspond to either a sheet or ink. A known method (for example, three-dimensional mesh deployment utilizing saddle point characteristics) is used as a method of mapping.

[Character Recognition of Page Data]

Figure 5A:
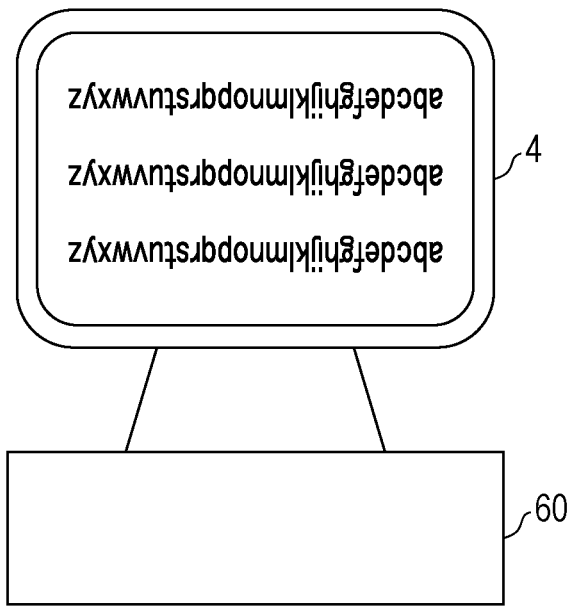
FIG. 5A is a view schematically illustrating a first state of character recognition from two-dimensional data by the book electronization apparatus according to Embodiment 1 of the disclosure and FIG. 5B is a view schematically illustrating a second state of the character recognition from the two-dimensional data by the book electronization apparatus according to Embodiment 1 of the disclosure.
Figure 5B:
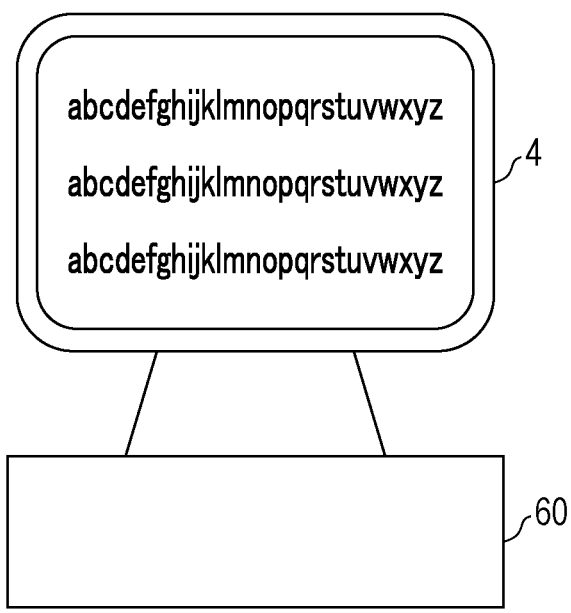

Hereinafter, character recognition of page data from two-dimensional data by the data generation unit 9 will be described. The two-dimensional data may be merely considered to be a set of nodes on a certain surface. When recognizing the set of the nodes as an appropriate character, the data generation unit 9 creates, from the two-dimensional data, data that is able to be displayed as a character in a suitable form. FIG. 5A is a view schematically illustrating a first state of character recognition from two-dimensional data by the book electronization apparatus according to Embodiment 1 of the disclosure. FIG. 5B is a view schematically illustrating a second state of the character recognition from the two-dimensional data by the book electronization apparatus.

The character recognition system 60 receives two-dimensional data (page data) from the image capturing apparatus 50 (for example, data generation unit 9) and displays, on the display unit 4, data for any one page in the page data (FIG. 5A). In a case where the number of characters included in one page is small, subsequent character recognition processing may be difficult. From a viewpoint of achieving smooth character recognition, it is suitable that proportion of character data in one page is about 30% of an area of the one page.

A user confirms a screen, which is displayed, and rotates the screen of the character data if need be (FIG. 5B).

Next, the user inputs, to the character recognition system 60, information about the character data that is displayed. Examples of the information include a direction of characters (horizontal writing, vertical writing, reading from the left, reading from the right, or the like), a type of the characters (alphabet, Arabic alphabet, Chinese character, or the like), and a language (English, French, Japanese, or the like). The character recognition system 60 refers to the information and thereby decides a first character with which character recognition is to be started, a recognition direction, and a recognition method.

As described above, the page data has information about a positional relation of a plurality of characters or graphics (arrangement of the characters or the like) in a page of the book. The page data is generated on the basis of a page region that is accurately specified. Thus, even when there is noise in the page data, an image such as a character string in the page data is able to be accurately identified. Accordingly, the book electronization apparatus 100 easily acquires information of a character string or graphic written or drawn in the book from the page data. As a result, the book electronization apparatus 100 is able to read not only an isolated character but also a word that is formed by a plurality of characters written in the book or a sentence that is formed by a plurality of such words. The user is able to easily identify the character string or the like in page data displayed on the display device 4.

[Explanation about Shortening of Imaging Time]

The book electronization apparatus 100 is able to shorten a time during which an image of a book is captured with an X-ray compared to a conventional book electronization apparatus. A reason therefor will be described below.

An X-ray transmission image includes shade due to a difference in an absorbance of an X-ray. An X-ray is transmitted through wood or paper almost without being absorbed, but is transmitted through ink in the book with being absorbed compared with the case of wood or paper. Thus, a difference in an X-ray transmission amount is reflected to page data. A difference in an X-ray transmission amount between paper and ink is generally so large that sufficient contrast is obtained, and thereby a character string in the page data is able to be accurately read out from the page data.

An absorbance of the X-ray by the ink is decided depending on a wavelength (intensity) of the X-ray and a material of the ink that is an object. In a case where the wavelength of the X-ray to be radiated is too long (intensity of the X-ray is too weak), the difference in the absorbance of the X-ray between the ink and the paper is too small, so that the contrast may be insufficient. Conversely, in a case where the wavelength of the X-ray to be radiated is too short (intensity of the X-ray is too strong), the X-ray is transmitted through not only the paper but also the ink, so that the contrast may be insufficient. Thus, the intensity (wavelength) of the X-ray is desired to be radiated so that the contrast between the ink and a medium (such as paper) in the book is sufficiently high. It is generally desirable that the wavelength (peak absorption wavelength) of the X-ray that is absorbed most by the ink is radiated, from a viewpoint of developing sufficient contrast described above.

The wavelength of the X-ray with which sufficient contrast is obtained is able to be decided on the basis of a result (behavior) of the absorbance of the X-ray, which is obtained in a case where a wavelength of the X-ray to be radiated to the ink or the book is gradually changed. Here, the "wavelength of the X-ray with which sufficient contrast is obtained" is, for example, a peak of a wavelength of the X-ray that is absorbed by the ink, and the "case where the wavelength of the X-ray to be radiated to the ink or the book is gradually changed" is, for example, a case where the intensity of the X-ray is gradually increased. However, it commonly takes a long time to change the intensity of the X-ray to be radiated. Accordingly, there is a tendency that it also takes a long time for converting the content of a book into electronic data by radiating an X-ray and detecting the absorption wavelength of the X-ray.

In Embodiment 1, a relation between a type of ink and a wavelength and absorbance when an X-ray is radiated to the ink (for example, an X-ray peak absorption wavelength when the absorbance is maximum) is examined in advance, and the type of the ink and the X-ray peak absorption wavelength corresponding to the ink are stored in a table. For example, in a case where a book that is a target includes the ink A, the book electronization apparatus 100 selects, as an X-ray to be radiated, the X-ray having the wavelength of 0.12 to 0.15 nm from the table by radiating the X-ray to the book and detecting the absorption wavelength of the X-ray, and performs visualization of the book (acquires three-dimensional data). Thus, in the book electronization apparatus 100, a time for adjustment of the wavelength of the X-ray to be radiated to the book is shortened. As a result, the book electronization apparatus 100 is able to more quickly acquire the page data. Accordingly, a time for acquiring electronic data of the book as a set of the page data is also further shortened.

Embodiment 2

Figure 6:
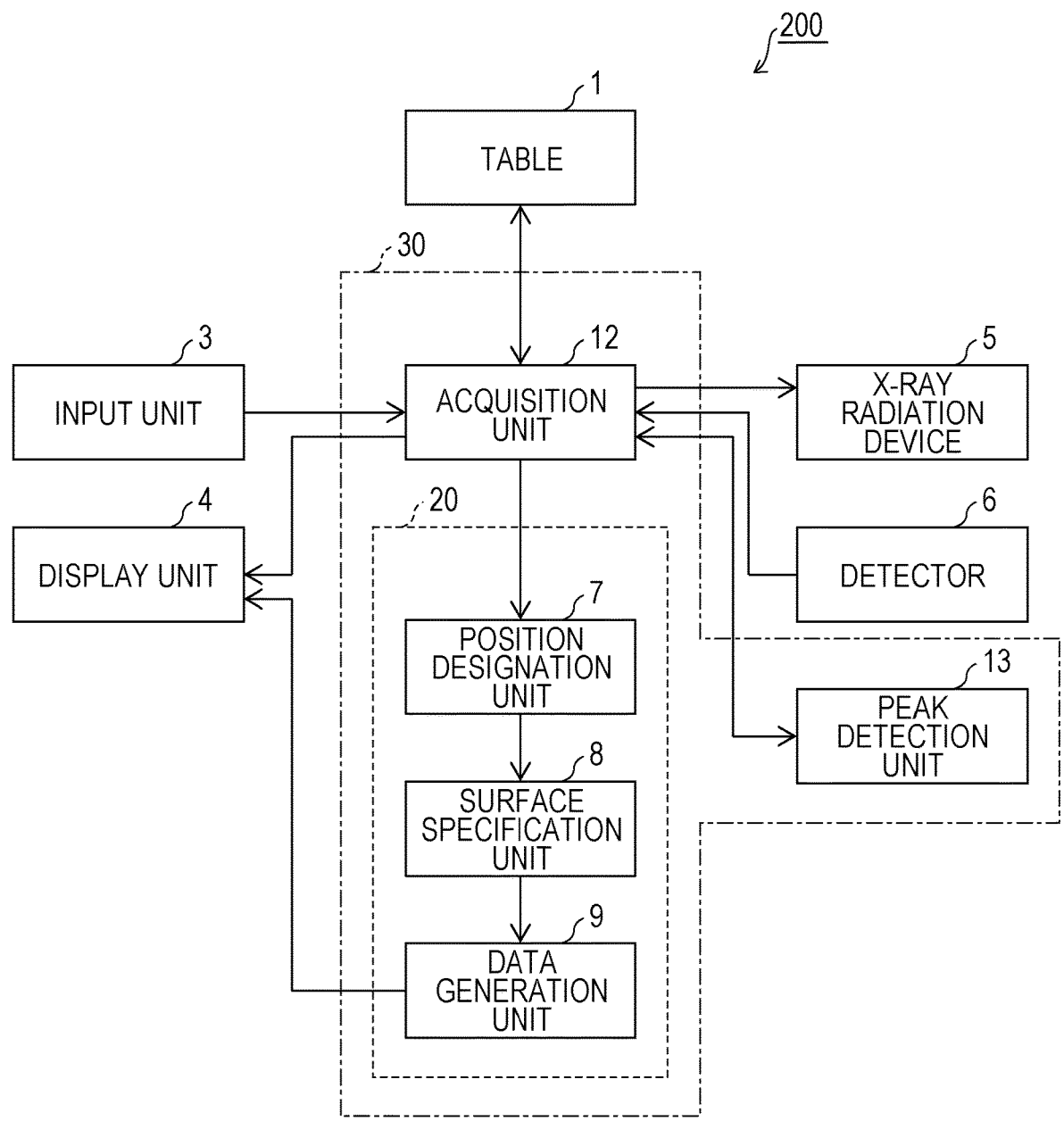
FIG. 6 is a block diagram of a book electronization apparatus according Embodiment 2 of the disclosure.

Another embodiment of the disclosure will be described below. Note that, for convenience of description, members having the same functions as those of the members described in the aforementioned embodiment will be given the same reference signs and description thereof will not be repeated. FIG. 6 is a block diagram of a book electronization apparatus 200 according Embodiment 2 of the disclosure.

As illustrated in FIG. 6, the book electronization apparatus 200 has an acquisition unit 12 instead of the acquisition unit 2, and has the same configuration as that of the book electronization apparatus 100 except that a peak detection unit 13 is further included. The peak detection unit 13 is connected to the acquisition unit 12. The peak detection unit 13 corresponds to an absorption wavelength detection unit that radiates an X-ray, which is an energy ray, to a book and detects the absorption wavelength of the X-ray to thereby detect an absorption wavelength of an energy ray of the ink in the book. Additionally, the acquisition unit 12 also functions as a data writing unit that writes the absorption wavelength of the energy ray, which is detected by the absorption wavelength detection unit, in the table 1 in association with information of the ink in the book.

Figure 7:
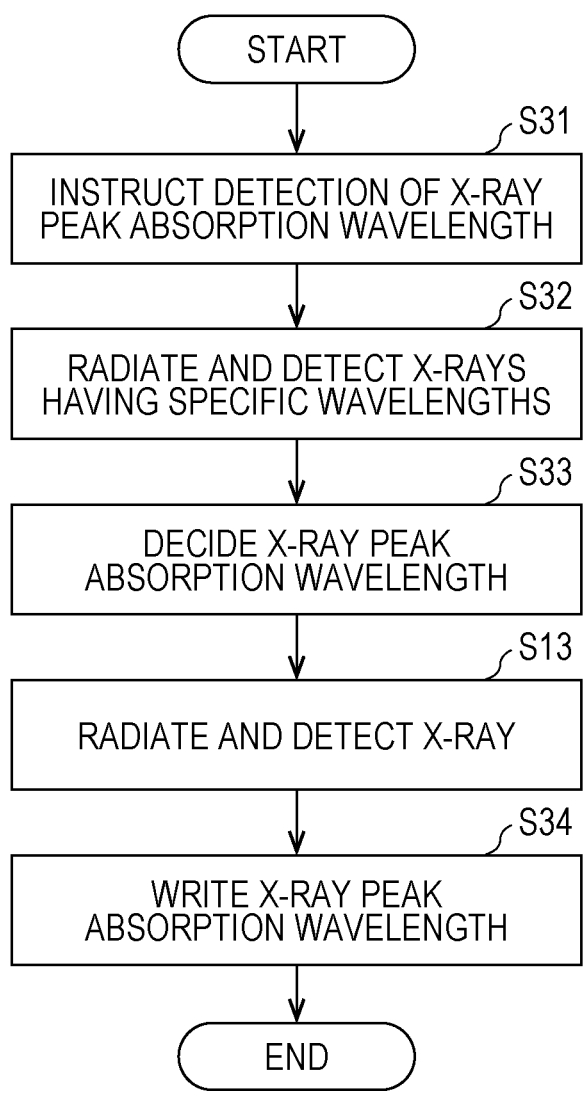
FIG. 7 is a flowchart until the book electronization apparatus according Embodiment 2 of the disclosure creates three-dimensional data of a book.

FIG. 7 is a flowchart until the book electronization apparatus 200 creates three-dimensional data of the book.

In a case where the ink type is not known or a case where the X-ray absorption wavelength corresponding to the ink type is not known, the acquisition unit 12 instructs the peak detection unit 13 to detect the X-ray peak absorption wavelength of the ink in the book (step S31). The instruction may be an instruction that is performed by input to the input unit 3 by a user, or may be an instruction that is automatically output from the acquisition unit 12 to the peak detection unit 13 when data about the wavelength of the X-ray, which is to be acquired from the table 1, is not able to be acquired.

Next, the peak detection unit 13 causes the X-ray radiation device 5 to radiate X-rays having various wavelengths and causes the detector 6 to detect the X-rays (step S32). For example, the wavelengths of the X-rays to be radiated to the book are set to be gradually reduced from 100 nm to 1 pm (0.001 nm) and then absorption intensity thereof detected by the detector 6 is confirmed. The wavelength of the X-ray that is radiated for detecting a peak may be decided in advance, or may be decided each time on the basis of a detection result. Radiation of the X-rays having different wavelengths is able to be performed by a known method. The radiation of the X-rays having different wavelengths is able to be performed by, for example, adjusting an output of an X-ray radiation device, interposing an optical filter that transmits an X-ray having a desired wavelength, or using a plurality of X-ray radiation devices that radiate X-rays having different wavelengths.

Next, the peak detection unit 13 decides an X-ray peak absorption wavelength of the ink in the book (step S33). The peak absorption wavelength of the ink may be a peak itself in absorption intensity of the X-ray in the detection result or may be a range of a specific absorbance including the peak of absorption wavelengths that are detected. The specific absorbance is, for example, an absorbance equal to or more than an absorbance with which sufficient contrast between the ink and the medium is obtained.

Even in a case where the type of the ink is not known, when an X-ray absorption wavelength corresponding to the ink is stored in the table 1, the peak detection unit 13 decides the peak absorption wavelength of the X-ray to be radiated to the book from the data about peak absorption wavelengths that are stored in the table 1. In this case, the peak detection unit 13 compares the detection result of the X-ray by the detector 6 and the X-ray peak absorption wavelength in the table 1. For example, in a case where the absorption intensity is maximum near 10 nm, the peak detection unit 13 determines that the ink in the book is the ink G, and in a case where the absorption wavelength is maximum near 0.01 nm, the peak detection unit 13 determines that the ink in the book is the ink F. The peak detection unit 13 outputs the decided peak absorption wavelength to the acquisition unit 12.

The acquisition unit 12 causes the X-ray radiation device 5 to radiate the X-ray having the wavelength that is decided by the peak detection unit 13 to the book and causes the detector 6 to detect the X-ray (step S13). As a result, the acquisition unit 12 acquires the three-dimensional data described above. Moreover, the acquisition unit 12 writes the X-ray peak absorption wavelength, which is decided by the peak detection unit 13, in the table 1 in association with information (for example, date and time of detection, a sample number, or the like) of the ink. Such data that is written in the table 1 is used, as data that is stored in the table 1 in advance, to decide an X-ray peak absorption wavelength as described above when the content of a book including ink of the same type is subsequently converted into electronic data. Accordingly, it is possible to shorten a time for converting the content of the book including the ink of the same type into electronic data from next time.

Modified Example

A book may be constituted by a medium and ink attached thereto. For example, the book may have a form of a booklet or a scroll. Additionally, the book may be a printed matter of one sheet, or a printed matter in which a plurality of sheets are not bound but overlapped. In the X-ray radiation device 5, a state of the book when an X-ray is radiated is not limited, and may be a closed state as described above, or an opened state.

The X-ray may be a different energy ray as long as absorption intensity of the different energy has sufficient contrast between ink and a medium. Examples of the energy ray other than the X-ray include an ultraviolet ray and visible light.

The medium is able to be appropriately decided as long as the energy ray is able to be transmitted and absorption intensity of the energy ray has a sufficient difference between the ink and the medium. An example of the medium other than paper includes a resin sheet.

An input of the ink type to the input unit may not be an input from a user. For example, information of the ink type, which is provided to the input unit from an ink analyzing device capable of communicating with the input unit, may be input.

As long as a type of ink and an absorption wavelength of an energy ray of the ink are able to be stored in association with each other prior to radiation of the energy ray to the book, the table 1 may not store such data all the time. For example, the table 1 may be a table that acquires correspondence data of the type of the ink and the X-ray peak absorption wavelength thereof by communication upon input of the ink type and stores the correspondence data. Alternatively, for example, the table 1 may be a table that stores, upon input of information of an attribute of the ink, such as input of a color or a manufacturer of the ink, correspondence data that corresponds to the input attribute of the ink and is provided by communication.

The wavelength of the energy ray to be radiated to the book is able to be appropriately decided as long as sufficient contrast between the ink and the medium is obtained. For example, the wavelength of the energy ray to be radiated to the book may be a wavelength with which sufficiently high contrast between the ink and the medium is obtained (for example, with which the contrast is maximum).

Information of the ink that is written in the table 1 in Embodiment 2 is able to be appropriately decided as long as correspondence between the information of the ink and the information of the X-ray wavelength, which are written in the table 1, is clear. The information of the ink is, for example, information of the ink when the correspondence between the type of the ink and the X-ray peak absorption wavelength corresponding thereto is not known. As described above, the information of the ink, which is written in the table 1, may be information, such as date and time of measurement, which is automatically decided or may be information (for example, information of a type of ink, a publication including the ink, or the like) input through the input unit 3 by the user.

[Implementation Example by Software]

The control block 30 (the table 1, the acquisition unit 2, 12, the position designation unit 7, the surface specification unit 8, the data generation unit 9, and the peak detection unit 13) of the book electronization apparatus 100, 200 may be implemented by hardware or may be implemented by software. An example of the hardware includes a logic circuit formed by an integrated circuit (IC chip) or the like. The table 1, the acquisition unit 2, 12, the position designation unit 7, the surface specification unit 8, the data generation unit 9, and the peak detection unit 13 in the book electronization apparatus 100, 200 may be controlled so as to perform the aforementioned function by a control unit that is separately provided.

In a case where the table 1 and the like are implemented by software, the book electronization apparatus 100 includes a computer that executes a command of a program that is software with which each function is realized. The computer includes, for example, at least one processor (control unit) and at least one computer-readable recording medium storing the program. Then, in the computer, the processor reads the program from the recording medium for execution, so that the disclosure is provided.

As the processor, a CPU (Central Processing Unit) is able to be used, for example. As the recording medium, "non-transitory tangible medium", for example, such as a tape, a disc, a card, a semiconductor memory, or a programmable logic circuit besides a ROM (Read Only Memory) or the like is able to be used. Moreover, a RAM (Random Access Memory) or the like that develops the program may be further included.

The program may be supplied to the computer through any transmission medium (a communication network, a broadcast wave, or the like) capable of transmitting the program.

An aspect of the disclosure is able to be provided in a form of a data signal in which the program is embodied with electronic transmission and which is embedded in a carrier wave.

[Conclusion]

An book electronization apparatus 100 according to an aspect 1 of the disclosure includes: a table 1 capable of storing a type of ink and an absorption wavelength of an energy ray of the ink in association with each other; an acquisition unit 2 that acquires, from the table 1, an absorption wavelength of an energy ray, which corresponds to an ink type that is input; and an image capturing unit (an acquisition unit 2, an X-ray radiation device 5, and a detector 6) that acquires three-dimensional data of a book by capturing an image of the book with the energy ray having the acquired absorption wavelength.

According to the aforementioned configuration, since the wavelength of the energy ray to be radiated is read out from the table 1 upon the input of the ink type, it is possible to greatly shorten a time for deciding the wavelength of the energy ray to be radiated. Thus, the conversion of the book into the electronic data is able to be performed in a short time.

The book electronization apparatus 100 according to an aspect 2 of the disclosure may further include an absorption wavelength detection unit (peak detection unit 13) that radiates an energy ray to the book and detects the absorption wavelength of the energy ray to detect an absorption wavelength of the energy ray of ink in the book, in the aspect 1.

According to the aforementioned configuration, it is possible to detect the absorption wavelength of the ink when correspondence between the ink type and an unknown X-ray absorption wavelength is not known and to further perform conversion of a book, in which either one or both of the ink type and the X-ray peak absorption wavelength corresponding thereto is not known, into electronic data.

The book electronization apparatus 100 according to an aspect 3 of the disclosure may further include a data writing unit (acquisition unit 12) that writes, in the table 1, the absorption wavelength of the energy ray, which is detected by the absorption wavelength detection unit, in association with information of the ink in the book, in the aspect 2.

According to the aforementioned configuration, a combination of an unknown ink type and the X-ray absorption wavelength corresponding thereto is able to be applied subsequent conversion of the book including the ink into electronic data. Accordingly, it is possible to shorten a time for the subsequent conversion of the book, in which the ink type or the absorption wavelength is not known, into electronic data.

The book electronization apparatus 100 according to an aspect 4 of the disclosure may further include a data creating unit 20 (a position designation unit 7, a surface specification unit 8, and a data generation unit 9) that creates two-dimensional data of the book from the three-dimensional data of the book, in the aspect 1.

According to the aforementioned configuration, it is possible to create electronic data (page data in a case where the book is a booklet) indicating a content of the book.

In the book electronization apparatus 100 according to an aspect 5 of the disclosure, the energy ray may be an X-ray, in the aspect 1.

According to the aforementioned configuration, it is possible to convert the content of a general book using paper as a medium into electronic data.

In the book electronization apparatus 100 according to an aspect 6 of the disclosure, the absorption wavelength may be a peak absorption wavelength of the ink, in the aspect 1.

According to the aforementioned configuration, it is possible to achieve sufficiently high contrast in the absorption intensity of the X-ray between the ink and the medium, and such a high contrast is more effective to clarify a content of the book in the obtained electronic data.

A book electronization method according to an aspect 7 of the disclosure includes: acquiring an absorption wavelength of an energy ray, which corresponds to an ink type that is input, from a table 1 capable of storing a type of ink and an absorption wavelength of an energy ray of the ink in association with each other; and acquiring three-dimensional data of a book by capturing an image of the book with the energy ray having the acquired absorption wavelength.

According to the aforementioned configuration, an effect similar to that of the aspect 1 is exerted.

The disclosure is not limited to the each of embodiments described above and may be modified in various manner within the scope of the claims, and an embodiment achieved by appropriately combining techniques disclosed in different embodiments is also encompassed in the technical scope of the disclosure. Further, by combining the techniques disclosed in each of different embodiments, a new technical feature may be formed.

The present disclosure contains subject matter related to that disclosed in Japanese Priority Patent Application JP 2018-026446 filed in the Japan Patent Office on Feb. 16, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A book electronization apparatus capable of converting a content of a book into data, the book electronization apparatus comprising:
   a table capable of storing a type of ink and an absorption wavelength of an energy ray of the ink in association with each other;
   an acquisition unit that acquires, from the table, an absorption wavelength of an energy ray, which corresponds to an ink type that is input;
   an image capturing unit that acquires three-dimensional data of a book by radiating, to the book, the energy ray having the acquired absorption wavelength and thereby detecting, from the energy ray which has passed through the book, an energy ray having intensity weaker than that of the energy ray which has passed through a medium of the book, the three-dimensional data including (i) a position of ink in the book at which the energy ray has been absorbed and (ii) absorption intensity of the energy ray.

2. The book electronization apparatus according to claim 1, further comprising an absorption wavelength detection unit that radiates an energy ray to the book and detects an absorption wavelength of the energy ray to detect an absorption wavelength of the energy ray of ink in the book, wherein
   in a case where an ink type is unknown or a case where an energy ray absorption wavelength corresponding to the ink type is unknown, the image capturing unit radiates, to the book, an energy ray having the absorption wavelength detected by the absorption wavelength detection unit instead of the absorption wavelength acquired from the table.

3. The book electronization apparatus according to claim 2, further comprising a data writing unit that writes, in the table, the absorption wavelength of the energy ray, which is detected by the absorption wavelength detection unit, in association with information of the ink in the book.

4. The book electronization apparatus according to claim 1, further comprising a data creating unit that creates two-dimensional data of the book from the three-dimensional data of the book.

5. The book electronization apparatus according to claim 1, wherein the energy ray is an X-ray.

6. The book electronization apparatus according to claim 1, wherein the absorption wavelength is a peak absorption wavelength of the ink.

7. A book electronization method capable of converting a content of a book into data, the book electronization method comprising:
- a) acquiring an absorption wavelength of an energy ray, which corresponds to an ink type that is input, from a table capable of storing a type of ink and an absorption wavelength of an energy ray of the ink in association with each other;
- b) radiating, to a book, the energy ray having the acquired absorption wavelength;
- c) detecting, from the energy ray which has passed through the book, an energy ray having intensity weaker than that of the energy ray which has passed through a medium of the book; and
- d) acquiring three-dimensional data of the book, the three-dimensional data including (i) a position of ink in the book at which the energy ray has been absorbed in step c) and (ii) absorption intensity of the energy ray.

* * * * *